(No Model.)
W. H. WRIGHT.
CAR AXLE LUBRICATOR.
No. 308,123. Patented Nov. 18, 1884.
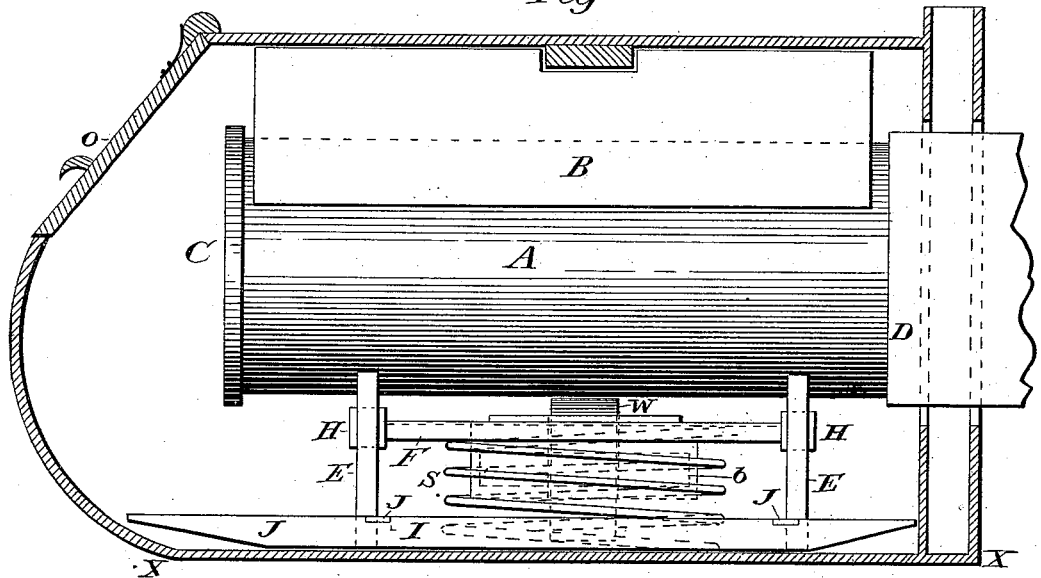
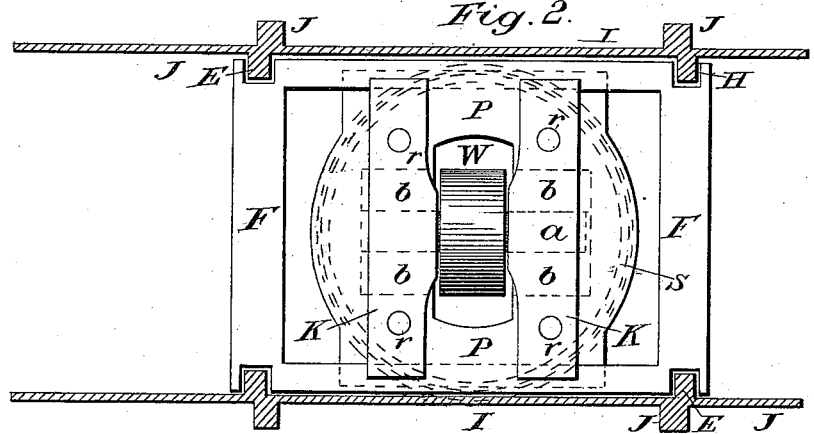
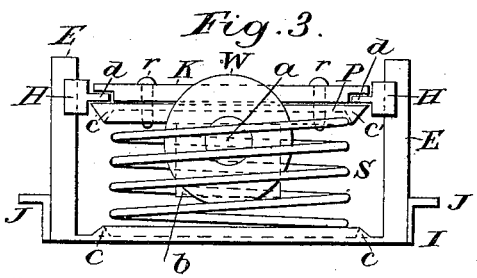
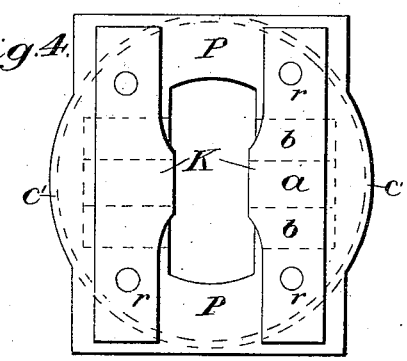
Witnesses:
H. B. Crossett
J. Nilson Luckey
Inventor,
William H. Wright
by A. S. Cushman
his attorney
N. PETERS. Photo-Lithographer, Washington, D. C.

UNITED STATES PATENT OFFICE.

WILLIAM H. WRIGHT, OF TARRYTOWN, NEW YORK.

CAR-AXLE LUBRICATOR.

SPECIFICATION forming part of Letters Patent No. 308,123, dated November 18, 1884.

Application filed August 15, 1883. (No model.)

*To all whom it may concern:*

Be it known that I, WILLIAM H. WRIGHT, a citizen of the United States of America, residing at Tarrytown, in the county of Westchester, in the State of New York, have invented a new and useful Improvement in Car-Axle Lubricators, of which the following is a full, clear, and exact description, reference being had to the accompanying drawings, wherein similar letters refer to similar parts throughout the several views.

My invention relates to improvements in car-axle lubricators, wherein one or more rollers revolving in an oil-reservoir or car-box by contact with the car-axle supplies the lubricant brought up on its periphery; and the objects of my improvements are to present to the car-axle an oiler which shall be capable of rotary as well as lateral and vertical motion corresponding to the changes of position of the car-axle when in motion; to avoid all liability of injury or displacement of the lubricator by shocks or by the sliding of the axle when long cars turn on short curves; to prevent the displacement or wear of the principal parts, while adequate play is allowed to the lubricating parts when in operation; to cause a return of the several parts to their original positions after any motion in either direction; to maintain a steady pressure of the lubricating-roller against the axle, and effect such distribution of the lubricant as shall secure a constant supply thereof to the bearings; to avoid the gradual wear consequent upon continuous contact of the roller and axle in one position; to obviate the necessity of employing ordinary "waste" in packing, and thereby effect important economy of time, labor, and material; to supply an efficient lubricator, and thereby prevent the possibility of "hot boxes" and the accompanying delays and risk of loss of life or property resulting from heated bearings and broken axles. I secure these objects by the mechanism illustrated in the accompanying drawings, in which—

Figure 1 shows a car journal-box with the lubricator in position, in which A is the car-axle; B, brass bearing; C, button; D, shoulder; E, standards; F, guiding-frame; S, spiral spring; H, flanges; W, lubricating-roller; P, sliding plate; I, adjustment-frame; *r r*, rivets. X is the journal-box, of which O is the door.

Fig. 2 is a plan of a lubricator, showing the projecting lugs or wings J, the standards E, and showing the guiding-frame F, the sliding-plate P with clips K, and by circular dotted lines the spring S, the outer circular line being the socket in which the spring is attached.

Fig. 3 is an end view, in which *a* is the axle of the roller; *b*, bearing-box for roller-axle; *c*, the socket to and in which the end of the spring is attached at the bottom, and *c'* the socket in which its upper end is attached upon the under surface of the sliding frame. *d d* are flanges of the guiding-frame.

Fig. 4 is a plan of the sliding plate and clip with space for the roller, the rectilinear dotted lines showing the position of the box for the roller-axle *a* and its journal. The circular dotted line shows the socket for the spring.

The stationary part of the device consists of a frame of any suitable metal—such as brass—provided with longitudinal and lateral projections or wings of the same, J J J J, bearing against the bottom and sides of the box near the bottom, to prevent its displacement, and also with permanent upright standards, E E E E, or posts to serve as ways for the vertical movements of the guiding-frame F. This stationary frame I designate as the adjustment-frame. It may be cast in one piece. It is provided with a shallow socket on its superior side holding the foot of a spiral spring thereto attached. As this socket is intended to be beneath the lubricating-roller, the center of the socket should be placed so far from the front of the box that no lateral slide of the axle can bring its button C over or upon the roller W. The standards may be cast with the rest of the adjustment-frame, or riveted or otherwise firmly attached to it.

To limit the upward action of the spring, small pins, pegs, or screws may be inserted for convenience near the upper extremities of the standards. These are not essential after the lubricator has been placed in the car-box, as the car-axle will sufficiently confine the guiding-frame, the standards being of sufficient height to admit of all vertical play to which such guiding-frames would ordinarily be exposed. The guiding-frame F is also preferably made of metal, and may be flanged, or it may work in grooves in the standards which guide its vertical movements. Its bearings upon the standards should be sufficiently extensive, equal, and closely fitting to effectually resist any other motion than those in a vertical direction, as I desire to secure an equal contact of the roller with the axle, and to so limit such guiding-frame as to avoid any oscillating or swinging motion of the roller or its sliding frame as being prejudicial. Such guiding-frame carries the sliding plate P, which slides upon two of its sides, and is likewise intentionally limited in every plane to simply movements in the line of the axis of the axle, and never susceptible of any oscillating or swinging motion. The sliding plate P, also of metal, is provided with journal-boxes for the roller-axle, and upon its inferior surface has a socket corresponding to that upon the adjustment-frame, to which socket is attached the upper end of the tension-spring S, which serves to maintain the roller in contact with the car-axle. The spring S also permits of the lateral sliding of the sliding plate P, and restores the sliding plate to its original position after any lateral movement of the roller.

The roller-axle may be confined in the journal-boxes $b\,b$, if desired, by straps or clips, as shown in the drawings, K K; but when it is placed beneath the car-axle the pressure exerted by the latter will be sufficient to maintain it in place in the boxes. The drawings also show such straps or clips attached to the plate by rivets and supporting and guiding the sliding plate. These clips may be adjusted as may be found most convenient, and like clips may be applied on the under side of the plate, so as to serve as a yoke supported by and capable of movement upon the sides of the guiding-frame or its flanges.

With the exception of the wings my lubricators are capable of being manufactured with the different parts of uniform size, so that they can be readily and interchangeably set up, or any portion of the lubricator supplied with its counterpart. These wings are intended to be sufficiently thin to admit of being cut, fitted, and shaped to bear against the lower parts of the sides of the car-box, so as to resist lateral movement in any direction.

When my machine is introduced into a car-box, the adjustment-frame rests upon the bottom of the box with its projecting wings bearing against and conforming to the lower part of the sides thereof. The oil or other lubricant can circulate freely within the box through the spring, the space between the standards and the opening left in the bottom of the adjustment-frame within the socket, and should always be sufficient in quantity to admit of the periphery of the roller descending below its surface. As the car-axle rotates the roller turns and carries up the lubricant adhering to its periphery, which as it comes in contact with the axle is distributed by pressure and diffusion throughout its length. If the axle of the car takes any lateral movement in the direction of its axis, it will communicate such lateral motion to the roller and the sliding plate, which then moves upon the guiding-plate in a similar direction. The roller is intended to present a broad uniform flat surface in contact with the axle upon it instead of grooved or spool contacts. When the lateral force ceases, the sliding plate is restored to its original position by the action of the elasticity of the spring. On the other hand, if the pressure in a vertical direction is increased or diminished, the guiding-frame carrying the sliding plate with the same spring responds thereto, so that no movement, however sudden or however great, can impair the mechanism.

In the drawings I have represented a spiral spring attached to the sliding plate and the adjustment-frame. I prefer such form of spring and attachment; but such sliding plate may be provided with an elliptical or other kind of spring subserving the same purpose of keeping the roller in contact with the car-axle and responding to any lateral as well as vertical movement.

I am aware that lubricators have been made with rollers and spools carrying bristles supported by a spring or springed yoke, and therefore I disclaim such use of such rollers, springs, or springed yoke; but

What I claim as new and as my invention, and for which I desire to obtain Letters Patent, is—

1. A sliding plate, P, carrying lubricating-roller W, and provided with guides restricting its lateral movements to horizontal motion in a direction parallel to the axis of the car-axle, such plate being provided on its inferior side with tension and pressure spring S, having its end sockets in such plate and in adjustment-frame I, respectively, substantially as herein described.

2. A guiding-frame, F, carrying a sliding plate or platform restricted to horizontal lateral sliding motion, lubricating-roller, clips, yokes or flanges, journal-boxes, and one or more springs attached to such sliding plate, such guiding-frame being also restricted to a vertical motion, substantially as herein described.

3. A car-axle lubricator with its roller operated by the contact and pressure of the car-axle, and provided with journal-bearings, one or more tension and pressure controlling and restoring springs, such roller being restricted in lateral horizontal movements to those parallel to the axis of the car-axle by sliding plate P, its clips, yokes or flanges, and by guiding-frame F, and its guides yielding and guided vertically by guiding-frame F, and its guides, ways, or flanges, substantially in the manner and for the purposes described.

WILLIAM H. WRIGHT.

Witnesses:
ELLIS B. SCHNEBEL,
WESLEY H. BRONSON.